United States Patent Office 3,081,924
Patented Mar. 19, 1963

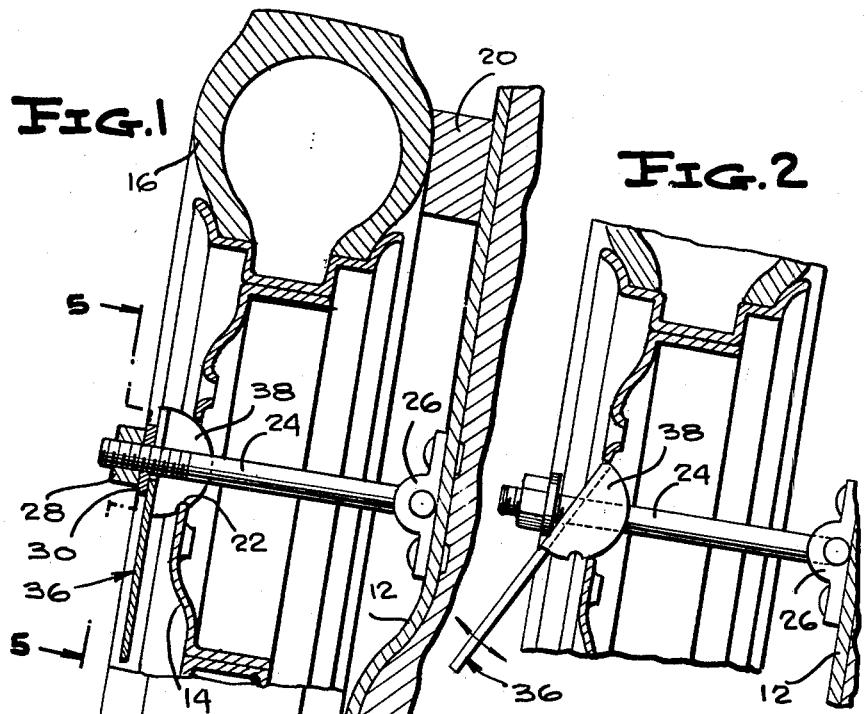
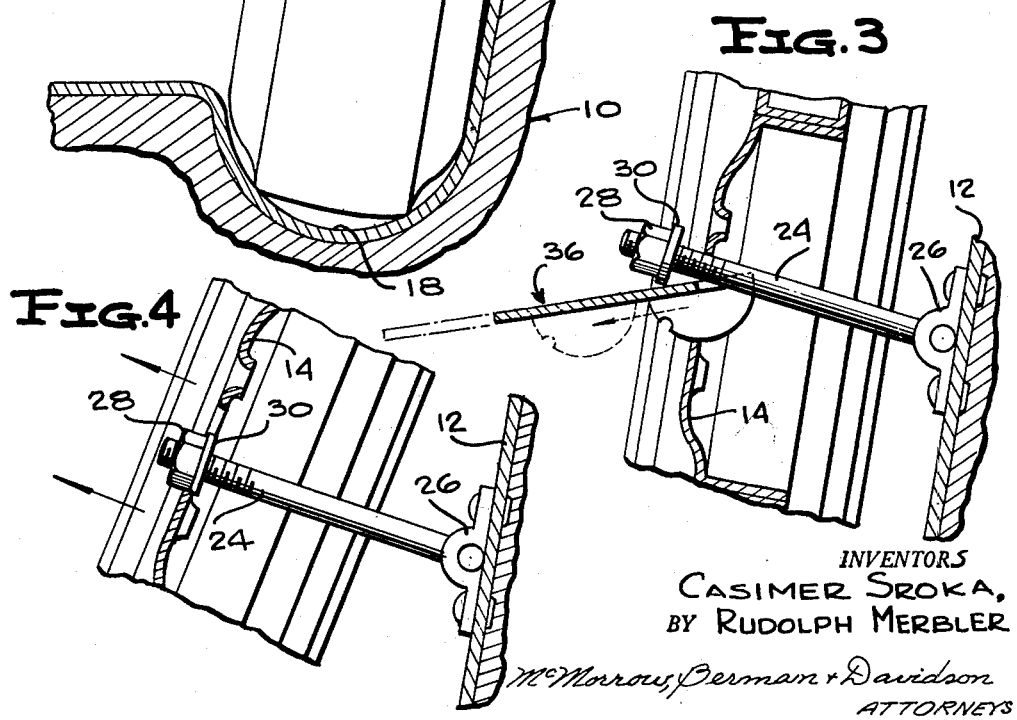

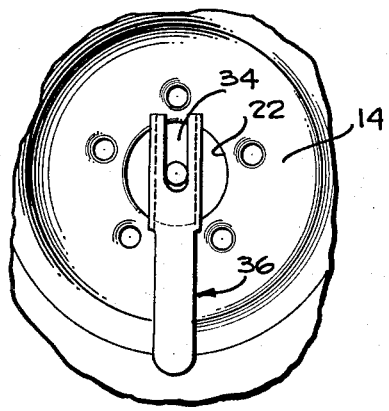
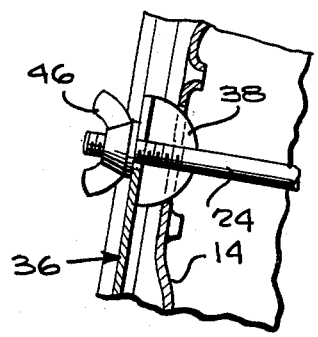
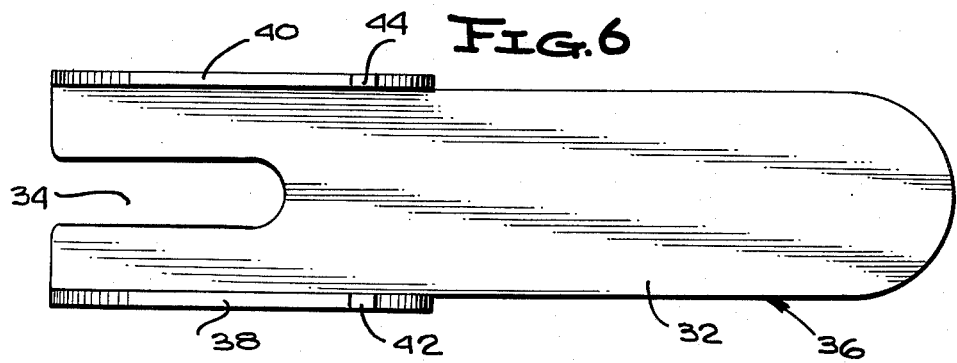
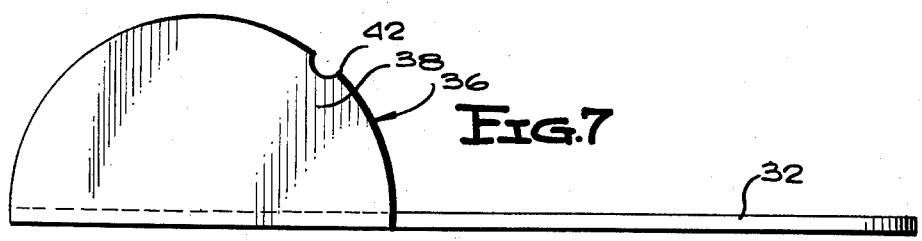
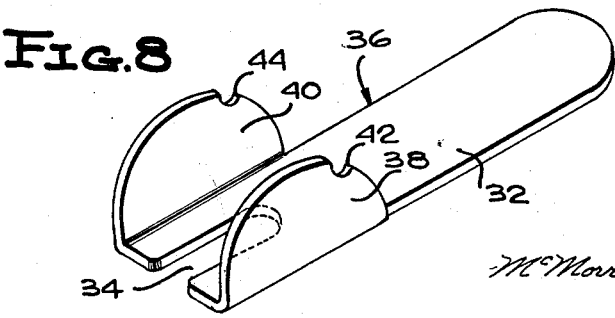

3,081,924
SPARE WHEEL LOCKING DEVICE
Rudolph Merbler, 15 Belaire Drive, R.R. 1, Box 247, Scotia, N.Y., and Casimer Sroka, R.D. 2, Altamont, N.Y.
Filed Mar. 4, 1960, Ser. No. 12,772
3 Claims. (Cl. 224—42.24)

The present invention relates to automotive vehicles generally and in particular to a locking device for securing the spare wheel within the vehicle.

Automotive vehicles presently in use are provided with storage space for a spare wheel and tire. Usually this space is within the trunk compartment, along one of the fender wells, or in a compartment in the floor of the trunk compartment. Means is provided for securing the tire and wheel against movement within the allotted storage space. Generally, the securing or restraining means is in the form of a bolt and a wing nut, frequently in conjunction with a clamp element of a size to embrace a portion of the tire or wheel. The assembly and attachment of the securing means has frequently been a source of annoyance to the operator of an automotive vehicle when it is necessary to remove the spare wheel and tire from the allotted storage space. Often, little or no use has been made of the spare wheel and tire for a period of time and it has been found that the wing nut may not be turned by manual force and a tool must be applied. Not only is this time-consuming but it frequently results in discarding of the securing or restraining means provided by the manufacturer in substitution of a make-shift securing means more easily applied and removed.

An object of the present invention is to provide a spare wheel and tire locking device which enables the instant release of a spare tire and wheel without the use of a wrench to remove a nut in order to free the spare tire and wheel.

Another object of the present invention is to provide a spare wheel and tire locking device which is of simple and foolproof construction and which serves as a means for securing the spare tire in place without requiring additional space in the trunk of the car where the tire is normally mounted.

A further object of the present invention is to provide a spare wheel locking device which is of such unique construction as to make it universally adaptable to all makes of cars.

These and other objects and advantages of the present invention will be fully apparent from the following description when taken in conjunction with the annexed drawings, in which:

FIGURE 1 is a view in section of a spare wheel and tire mounted in a storage compartment within the trunk of a vehicle, the locking device of the persent invention shown in locked condition thereon.

FIGURE 2 is a partial view in section of the assembly shown in FIGURE 1, the locking device being shown in a partially removed position.

FIGURE 3 is a view similar to FIGURE 2, the locking device being shown in released position prior to removal, the dotted line shown indicating the device in the removed position.

FIGURE 4 is a fragmentary sectional view similar to FIGURES 2 and 3 showing the locking device removed and the tire partially removed from the storage compartment.

FIGURE 5 is a view taken on the line 5—5 of FIGURE 1.

FIGURE 6 is a plan view of the device of the present invention.

FIGURE 7 is a side elevational view of the assembly shown in FIGURE 6.

FIGURE 8 is an isometric view of the device of the present invention, on a reduced scale.

FIGURE 9 is a fragmentary view in section showing the device of the present invention in use with a wing nut on the restraining bolt.

Referring in greater detail to the drawings in which like numerals indicate like parts throughout the several views, in FIGURE 1 the reference numeral 10 designates generally the body of an automotive vehicle and the reference numeral 12 the wall of the trunk compartment of the vehicle body 10. A spare wheel 14 having a tire or tire casing 16 extending about the perimeter of the wheel 14, is positioned within a well 18 provided in the trunk compartment in side-by-side relation with respect to the adjacent portion of the trunk compartment wall 12.

A supporting block 20 is positioned on one side of the wheel 14 and is fastened to the wall 12. The block 20 is adapted to be engaged by the side of the tire casing 16 when the latter is in a position within the well 18.

The wheel 14 is provided with an opening 22 receiving the projecting portion of the axle of the vehicle when the wheel is in use supporting the vehicle.

A bolt 24 extends through the opening 22 from one side to the other side of the wheel 14 and has one end pivotally mounted in a bracket 26 secured to the wall 12. A nut 28 with a washer 30 is disposed on the portion of the bolt 24 exteriorly of the wheel 14, the nut 28 being threaded on the bolt portion.

The locking device of the present invention comprises a plate member 32 having a slot 34 extending inwardly from one end thereof and terminating in a point spaced from the other end. The locking device is shown most clearly in FIGURES 6 to 8, inclusive, and is designated generally by the reference numeral 36.

A pair of arcuately curved plates 38 and 40 project from one end of the plate member 32 adjacent the slot 34. The plates 38 and 40 constitute a head straddling the slot 34. Notches 42 and 44 are provided in the peripheries of the plates 38 and 40, respectively.

In use, the head on one end of the plate member 32, such head being formed by the plates 38 and 40, is insertable through the opening 22 to a position in which the slot 34 receives the bolt 24 below the washer 30, as shown in FIGURE 1. The plate member 32 is shifted so as to press the peripheries of the plates 38 and 40 against the walls of the opening 22 and to force the tire 16 against the block 20 resulting in movement of the plate member so that it extends in an upwardly sloping direction with the portion of the bolt 24 slidably received in the slot 34.

Releasable latch means is provided on the plate member 32 engageable with the wheel 14 for holding the plate member in the upstanding position. This means embodies the notches 42 and 44 in the peripheries of the plates 38 and 40, the notches 42 and 44 receiving the wall of the opening 22, as shown in FIGURE 1. In use, the device 36 is readily inserted through the opening 22 and moved so that the plate member 32 is in the upright position parallel to the wheel 14, as shown in FIGURE 1. The plates 38 and 40 serve as guides and fulcrum members by means of which the washer is engaged by the outer face of the plate member 32 and outward pressure is exerted upon the bolt 24, as in FIGURE 2, to compress the tire casing 16 against the support block 20 while the plate member 32 is shifted to the upright position of FIGURE 1.

Removal of the device 36 is accomplished with ease and facility by merely pulling on the end of the plate member 32 remote from the plates 38 and 40, tilting or swinging the device 36 from the inserted position to an upstanding position relative to the tire casing 16 and shifting the plate member 32 from the position in which the portion adjacent one end bridges the opening 22 and engages the walls of the opening 22 with the outer or front face abutting the washer and nut 28.

When the device has been shifted to the position shown in full lines in FIGURE 3 it may be pulled readily outwardly to the dotted line position, freeing the bolt 24 from the wheel 14 and permitting, as in FIGURE 4, removal of the wheel 14 from its position adjacent the wall 12 of the trunk compartment.

An alternative arrangement is shown in FIGURE 9 in which the device 36 is employed with a wing nut 46 on the bolt 24 if found to be more practical. In either case the nut 28 or the wing nut 46 is freely movable upon the bolt 24 to any position of adjustment in which, when the device 36 has been inserted through the opening 22 and swung to the upstanding position, the tire casing 16 is held snugly against the support provided on the wall 12.

In this connection it is important to note that in emergency situations, a spare tire and wheel can serve as a life saver means. By virtue of the device of the present invention, the spare wheel can be instantly demounted from its mounting and be employed for water rescue operations whether conducted by the police or any other person.

For example, the spare tire and wheel can be employed as a rescue tool for saving a person who has fallen through thin ice. If such person is unable to be reached due to thin ice, the spare tire wheel can be slid across the ice to give some support until other rescue means is made available.

What is claimed is:

1. In combination with a motor vehicle, a spare wheel provided with an opening disposed centrally thereof, a tire casing extending about the perimeter of said wheel, a supporting block on one side of said wheel and fixedly attached to said vehicle and adapted to engage the side of said tire casing, a bolt extending through said opening from one side to the other side of said wheel with the portion adjacent one end extending beyond the other side of said wheel, a nut in threaded engagement with said one end portion, a locking device comprising a plate member having a slot extending inwardly from one end thereof and terminating at a point spaced from the other end thereof, a head on said one end of said plate member straddling said slot, said head being insertable through said opening so that the plate member extends in an upwardly sloping direction with said portion of said bolt slidably received in said slot and being swingable from the inserted position to an upstanding position in which said head bridges the opening and engages the walls of the opening with the front face abutting said nut, said head when swung to the upstanding position causing said tire casing to bear against said supporting block, and releasable latch means on said head engageable with the wall of said wheel opening for holding the plate member in the upstanding position.

2. The combination with a motor vehicle, a spare wheel provided with an opening disposed centrally thereof, a tire casing extending about the perimeter of said wheel, a supporting block on one side of said wheel and fixedly attached to said vehicle and adapted to engage the side of said tire casing, a bolt extending through said opening from one side to the other side of said wheel with the portion adjacent one end extending beyond the other side of said wheel, and a nut in threaded engagement with said one end portion, a locking device comprising a plate member having a slot extending inwardly from one end thereof and terminating at a point spaced from the other end thereof, a head embodying a pair of arcuately-shaped plates projecting from said one end of said plate member straddling said slot, the plates of said head being insertable through said opening so that the plate member extends in an upwardly sloping direction with said portion of said bolt slidably received in said slot and being swingable from the inserted position to an upstanding position in which the plates of said head bridges the opening and engages the wall of the opening with the front face of said plate member abutting said nut, the plates of said head when said plate member is swung to the upstanding position causing said tire casing to bear against said supporting block.

3. The combination with a motor vehicle, a spare wheel provided with an opening disposed centrally thereof, a tire casing extending about the perimeter of said wheel, a supporting block on one side of said wheel and fixedly attached to said vehicle and adapted to engage the side of said tire casing, a bolt extending through said opening from one side to the other side of said wheel with the portion adjacent one end extending beyond the other side of said wheel, and a nut in threaded engagement with said one end portion, a locking device comprising a plate member having a slot extending inwardly from one end thereof and terminating at a point spaced from the other end thereof, a head embodying a pair of arcuately-shaped plates projecting from said one end of said plate member straddling said slot, there being a notch provided in each of said arcuate plates, the plates of said head being insertable through said opening so that the plate member extends in an upwardly sloping direction with said portion of said bolt slidably received in said slot and being swingable from the inserted position an upstanding position in which the plates of said head bridge the opening and the notches thereof engage the wall of the opening with the front face of said plate member abutting said nut, the plates of said head when said plate member is swung to the upstanding position causing said tire casing to bear against said supporting block.

References Cited in the file of this patent

UNITED STATES PATENTS

| | | |
|---|---|---|
| 2,043,125 | Stahl | June 2, 1936 |
| 2,091,748 | Brown | Aug. 31, 1937 |
| 2,420,165 | Clutter | May 6, 1947 |
| 2,454,309 | Davis | Nov. 23, 1948 |
| 2,488,481 | Stephenson et al. | Nov. 15, 1949 |
| 2,797,036 | Geiger | June 25, 1957 |